A. CUNNINGHAM.
Clapboard Machine.

No. 230,111. Patented July 20, 1880.

Witnesses:
C. G. Asmun
E. H. Bottum

Inventor:
Albert Cunningham
per S. S. Stint
Attorney

UNITED STATES PATENT OFFICE.

ALBERT CUNNINGHAM, OF MILWAUKEE, WISCONSIN.

CLAPBOARD-MACHINE.

SPECIFICATION forming part of Letters Patent No. 230,111, dated July 20, 1880.

Application filed December 18, 1879.

*To all whom it may concern:*

Be it known that I, ALBERT CUNNINGHAM, of Milwaukee, in the county of Milwaukee, and in the State of Wisconsin, have invented certain new and useful Improvements in Machines for Sawing Siding; and I do hereby declare that the following is a full, clear, and exact description thereof, reference being had to the accompanying drawings, which form part of this specification.

My invention relates to siding-machines; and it consists in a device for working the entire log into sidings, as will be hereinafter fully described.

Figure 1:
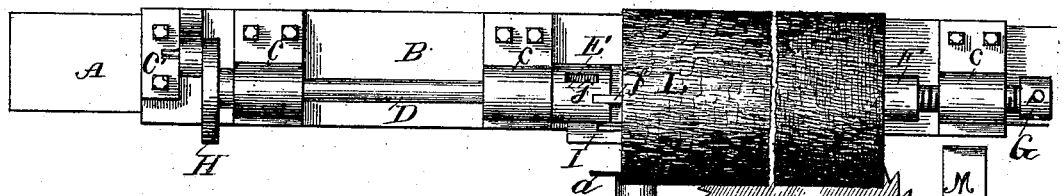
Figure 4:
Figure 3:
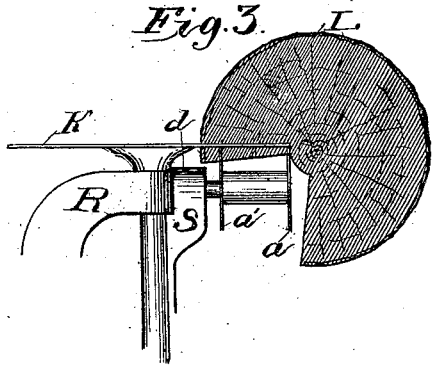
Figure 2:
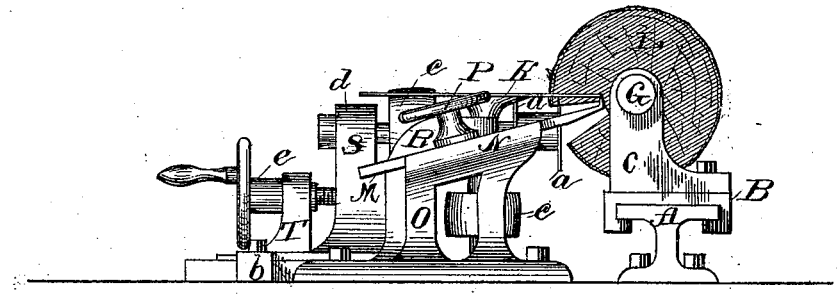

In the drawings, Figure 1 is a plan view; Fig. 2, an end view, and Figs. 3 and 4 details.

The main saw K is carried by an upright arbor, and the edging-saws a a' by a horizontal arbor at right angles to that of the main saw and just in advance of it.

The bracket R, which supports the arbor of the main saw, is securely fixed to the floor.

The arbor of the edging-saws has bearings in a bracket, S, which is secured to the floor by lugs b, which permit it to be shifted longitudinally by a screw-shaft, e, shouldered in the bracket T.

The log to be sawed into sidings is secured between dogs E and F, which bite into it at each end, and by which it is revolved to present it to the main saw for successive radial cuts. In addition to these central dogs, I use also an angular dog, I.

O is a bracket, which is grooved at N to receive a knife, M, and support it at an angle to the main saw K. This knife is adjustable, and is held in position by a binding-screw.

G is a screw for forcing the dogs E and F into the log.

c c c are bearings in the log-carrier B, which is arranged to reciprocate upon a rail, A, and H is a spacing-wheel.

As the dog F is loosely attached to the screw G, it can revolve with the log, which is turned by the shaft D and dog E. The latter is slotted, as shown at j, to receive one arm, i, of the elbow or angular dog I, the other arm of which is pointed, or has a knife-edge, i', for entering the log. The slot j is longer than the greatest width of the arm i, while the arm fits it snugly the other way. Now, as the dog I has plenty of play in the direction of the length of slot j, it may be driven into the log to assist the dog E in controlling it while it is heavy and unmanageable; but after the log has been nearly consumed it may be driven out and thrown aside out of the way to allow the entire log to be consumed.

Operation: The log having been secured between the dogs E and F, the edging-saws and knife drawn back to their fullest extent, the log is advanced against the saw K, which will make a radial cut extending nearly to the center of the log, or in to a sufficient extent to give proper width to the siding required. The log is then "gigged," turned slightly, and again advanced, the cuts running into each other, and this is continued until the log is cut away sufficiently to permit the entrance into the cut of the knife M, the cutting-edge of which should be higher in the middle than at its ends, and extends up at about a right angle to its shank. The edging-saws may now be advanced until one, a, is in the position shown in Fig. 2. Now the log may be turned a proper distance to present enough material to the saw for a siding of the right thickness. Upon being advanced it will first meet the saw a, which will groove it near the sap; then the saw K will make the radial cut, after which the knife M, having been advanced so that its cutting-edge is in line with the depth of the kerf made by saw K, will cut off the siding as the log advances. This operation is repeated until about one-sixth of the log has been consumed and a sufficient opening has been made to permit the advancement of the edging-saw a into the log to take the place of the knife, when the saw a' will be in the position shown in Fig. 3, and will do the work at first done by a. The knife may now be retracted, to be used again only when a fresh log is ready.

What I claim as my invention, and desire to secure by Letters Patent, is—

1. In a siding-machine, the combination, with a device for revolving and reciprocating it, of a saw arranged to cut into the log on lines radiating from its center, and an adjustable knife arranged beyond the saw to separate the siding from the core of the log, as and for the purpose set forth.

2. The combination, in a siding-machine, of the adjustable edging-saws, main saw K, and an adjustable knife for separating the siding from the core of the log as it passes from the main saw, as set forth.

3. The combination of adjustable edging-saws $a$ $a'$, main saw K, the adjustable knife having a cutting-edge at right angles to the main saw, and a reciprocating log-carrier, as set forth.

In testimony that I claim the foregoing I have hereunto set my hand this 13th day of December, 1879.

ALBERT CUNNINGHAM.

Witnesses:
E. H. BOTTUM,
C. F. HUNTER.